(12) United States Patent
Hay et al.

(10) Patent No.: US 10,369,622 B2
(45) Date of Patent: Aug. 6, 2019

(54) PRECISION FORGED CARTRIDGE CASE

(71) Applicant: National Machinery LLC, Tiffin, OH (US)

(72) Inventors: Thomas E. Hay, Tiffin, OH (US); Jeffrey W. Carper, Tiffin, OH (US); Stanley J. Wasserman, Tiffin, OH (US)

(73) Assignee: NATIONAL MACHINERY LLC, Tiffin, OH (US)

( * ) Notice: Subject to any disclaimer, the term of this patent is extended or adjusted under 35 U.S.C. 154(b) by 625 days.

(21) Appl. No.: 14/642,928

(22) Filed: Mar. 10, 2015

(65) Prior Publication Data

US 2015/0174643 A1 Jun. 25, 2015

Related U.S. Application Data

(62) Division of application No. 13/628,246, filed on Sep. 27, 2012, now Pat. No. 9,016,184.

(51) Int. Cl.
| | | |
|---|---|---|
| *B21J 5/02* | (2006.01) | |
| *B21D 51/54* | (2006.01) | |
| *B21J 13/02* | (2006.01) | |
| *B21K 21/04* | (2006.01) | |
| *B23D 21/14* | (2006.01) | |
| *B23P 15/22* | (2006.01) | |
| *F42B 5/28* | (2006.01) | |

(52) U.S. Cl.
CPC .............. *B21K 21/04* (2013.01); *B21D 51/54* (2013.01); *B21J 5/025* (2013.01); *B21J 5/027* (2013.01); *B21J 13/02* (2013.01); *B23D 21/14* (2013.01); *B23P 15/22* (2013.01); *F42B 5/28* (2013.01)

(58) Field of Classification Search
CPC .......... B21K 21/04; B21D 51/54; B21J 5/025; B21J 5/027; B21J 13/02; B23P 15/22; B23D 21/04; B23D 21/14
See application file for complete search history.

(56) References Cited

U.S. PATENT DOCUMENTS

| | | | |
|---|---|---|---|
| 1,669,969 | A | 5/1928 | Caruth |
| 2,183,637 | A | 12/1939 | Biginelli |
| 2,220,652 | A | 11/1940 | Irmann |
| 2,350,491 | A | 6/1944 | Butler et al. |

(Continued)

FOREIGN PATENT DOCUMENTS

| | | |
|---|---|---|
| DE | 719783 C | 4/1932 |
| DE | 732984 C | 3/1943 |

(Continued)

OTHER PUBLICATIONS

Notification of Transmittal of the International Search Report and The Written Opinion of the International Searching Authority, or the Declaration for PCT/US2013/057969, filed Sep. 4, 2013; International Search Report dated Dec. 12, 2013; Written Opinion of the International Searching Authority dated Dec. 12, 2013.

(Continued)

*Primary Examiner* — Theresa M Ekiert
(74) *Attorney, Agent, or Firm* — Pearne & Gordon LLP

(57) ABSTRACT

An improved cartridge case completely produced net shape on a progressive cold former that includes a trim to lengthy station with an internal shearing tool.

1 Claim, 9 Drawing Sheets

(56) References Cited

U.S. PATENT DOCUMENTS

| | | |
|---|---|---|
| 2,371,716 A | 3/1945 | Snell |
| 2,736,085 A | 2/1956 | Parre et al. |
| 2,904,873 A | 9/1959 | Hild |
| 3,014,274 A | 12/1961 | Callahan |
| 3,176,614 A | 4/1965 | Woodring |
| 3,234,772 A | 2/1966 | Fehling et al. |
| 3,363,296 A | 1/1968 | Duffield |
| 3,498,221 A | 3/1970 | Hilton et al. |
| 3,614,816 A | 10/1971 | Weyhmuller et al. |
| 3,984,259 A | 10/1976 | Rogers, Jr. et al. |
| 4,041,868 A | 8/1977 | Rayle et al. |
| 4,198,843 A | 4/1980 | Spence |
| 4,296,536 A | 10/1981 | Hicke |
| 4,455,725 A | 6/1984 | van Baal |
| 4,494,461 A | 1/1985 | Pryor et al. |
| 4,635,514 A * | 1/1987 | Borzym ............... B23D 21/14 83/186 |
| 5,507,232 A | 4/1996 | Valdez |
| 5,713,237 A | 2/1998 | Bruns |
| 6,484,616 B1 | 11/2002 | Giraud |

FOREIGN PATENT DOCUMENTS

| | | |
|---|---|---|
| EP | 0 087 911 A1 | 9/1983 |
| GB | 128271 | 6/1919 |
| RU | 2113309 C1 | 6/1998 |
| RU | 2446909 C2 | 9/2011 |
| SU | 488640 A1 | 10/1975 |
| SU | 733794 A1 | 5/1980 |
| SU | 1146123 A1 | 3/1985 |
| SU | 1784403 A1 | 12/1992 |
| WO | 2010/112149 A1 | 10/2010 |

OTHER PUBLICATIONS

National Machinery LLC Drawing No. 2610U905015Z—9MM Luger Cartridge Case.

* cited by examiner

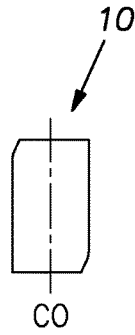 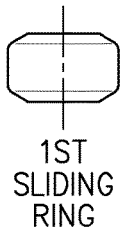 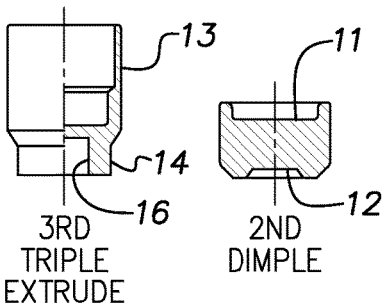 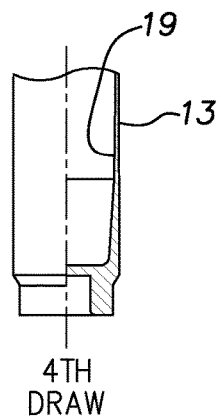 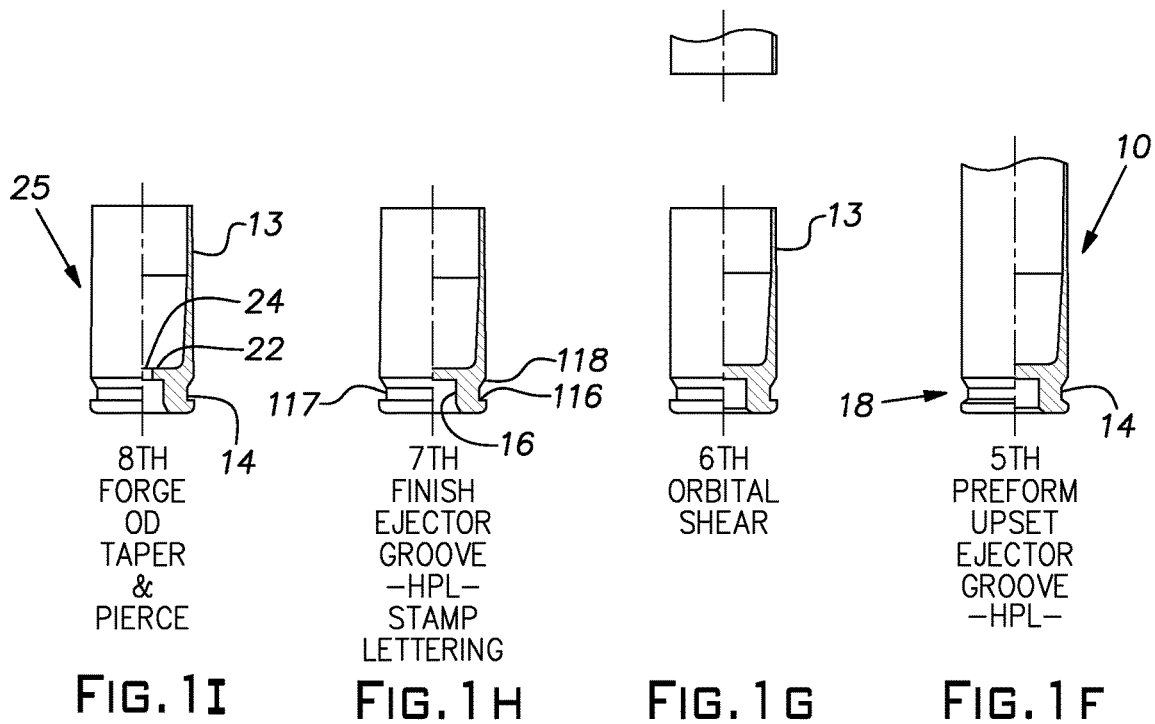

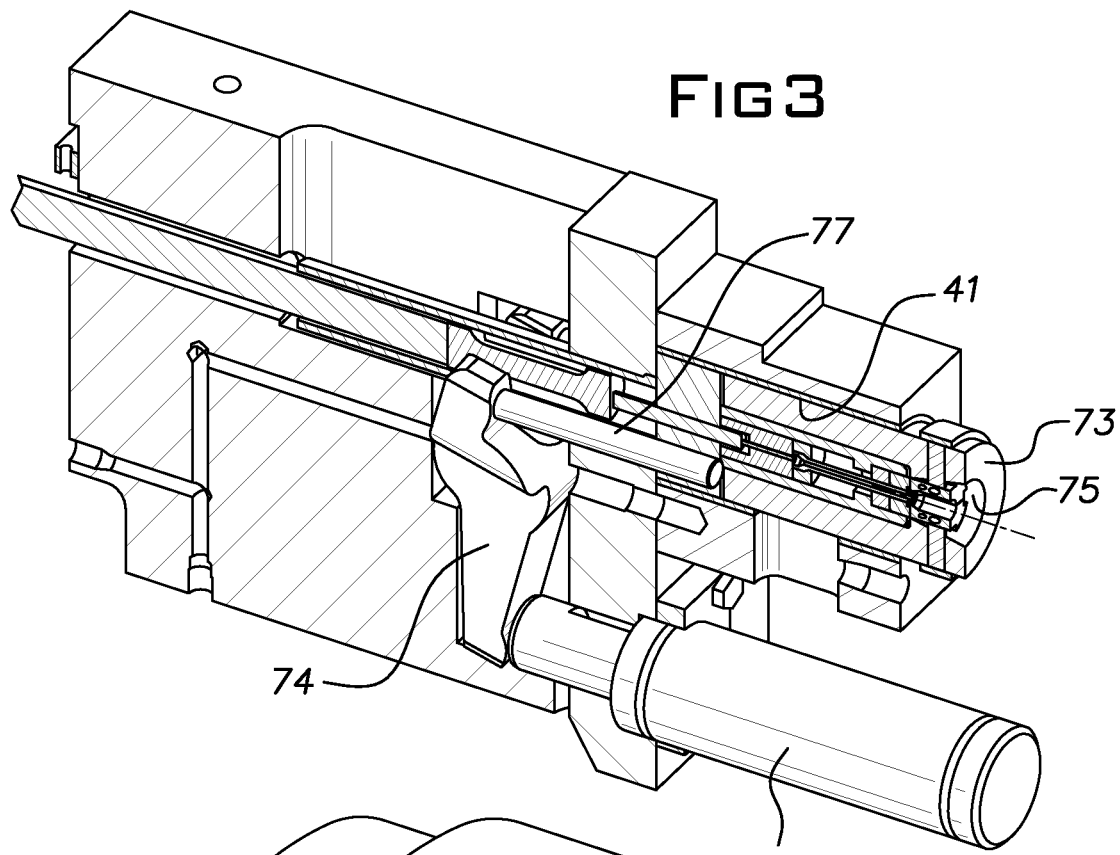
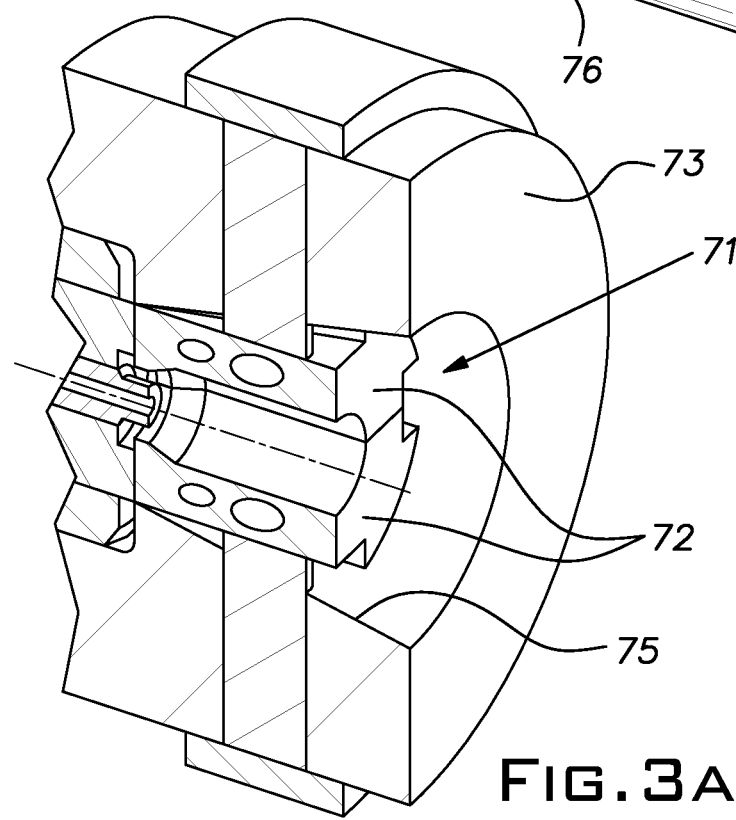

PRECISION FORGED CARTRIDGE CASE

BACKGROUND OF THE INVENTION

The invention relates to cartridge cases and their manufacture.

PRIOR ART

Brass cases for firearm cartridges are conventionally made in numerous steps and on successive machines, often with intermediate annealing steps. Traditionally, cases are formed from strip stock that is cupped and then drawn. Once drawn, the blanks are machined to length and to provide an ejector groove. The strip stock method produces a high scrap ratio, requires energy for annealing, is slow, and occupies considerably floor space. It is known to cold form a hollow thin wall intermediate blank for a cartridge case from solid wire. Whether made from strip stock or wire stock, when a heavily drawn preform is produced, it has an irregular edge on the open end which, traditionally, is machined for a precise end surface after discharge from the forming tooling. The preform, after discharge from the forming tooling, is also typically machined to create an ejector groove adjacent its head or rearward end.

There are several additional drawbacks to these known methods of manufacturing cartridge cases. Transferring case preforms from one bank of forming machines, for example, to a bank of turning machines, introduces dimensional variations that can be difficult to manage because of the multiple potential combinations of machines used to make cases. Labor costs are typically involved in transferring blanks between successive machines and each of the machines must be monitored and maintained adding additional costs and variability to the manufacture of cases. The machining operations create scrap, in particle, chip shaving and/or dust form, giving rise to maintenance and scrap recycling issues.

SUMMARY OF THE INVENTION

The invention provides an improved cartridge case, as well as a method and apparatus for its manufacture. The case is fully cold formed from metal wire stock, typically brass, in a single forming machine. The disclosed case is of the rimless, solid head type with an ejector groove on the head end. The case is formed at high production speeds to finished shape with stock removal limited to cutting a short ring off the forward end of a deep drawn cylindrical wall to obtain a uniform edge and punching out a small slug to form the flash hole. The ejector groove is fully formed on the blank without corresponding material removal. The forming process improves the metallurgical properties of the blank, particularly at the critical area of the ejector groove. The inventive method renders the case less prone to failure through cracking or other mishap during assembly, usage and reloading.

The inventive process starts with a blank cut from solid wire. The blank is upset and extruded to form early stages of a primer pocket, a tubular charge and bullet space, and the ejector groove. In later forming stages, areas of the blank associated with the primer pocket are upset and folded radially outwardly to form a rear wall or flange of the ejector groove. The tubular part that is the preform for the charge and bullet space is deep drawn axially into a thin wall tube, and then finish trimmed at its distal end with a novel orbital shear. After end trimming, the thin wall tube is forged into a slightly conical shape. The case is completed in the forming machine and requires no secondary machining or annealing.

BRIEF DESCRIPTION OF THE DRAWINGS

FIG. 1A-1I illustrate progressive forming steps, embodying aspects of the invention, used to make a cartridge case starting with a solid wire cutoff blank and finishing with a completed case;

FIG. 3 is a perspective cut-away view of a die station in which a preform ejector groove is formed on a blank;

FIG. 3A is an enlarged view of die sections used in the station illustrated in FIG. 3;

DESCRIPTION OF THE PREFERRED EMBODIMENT

Figure 2A:
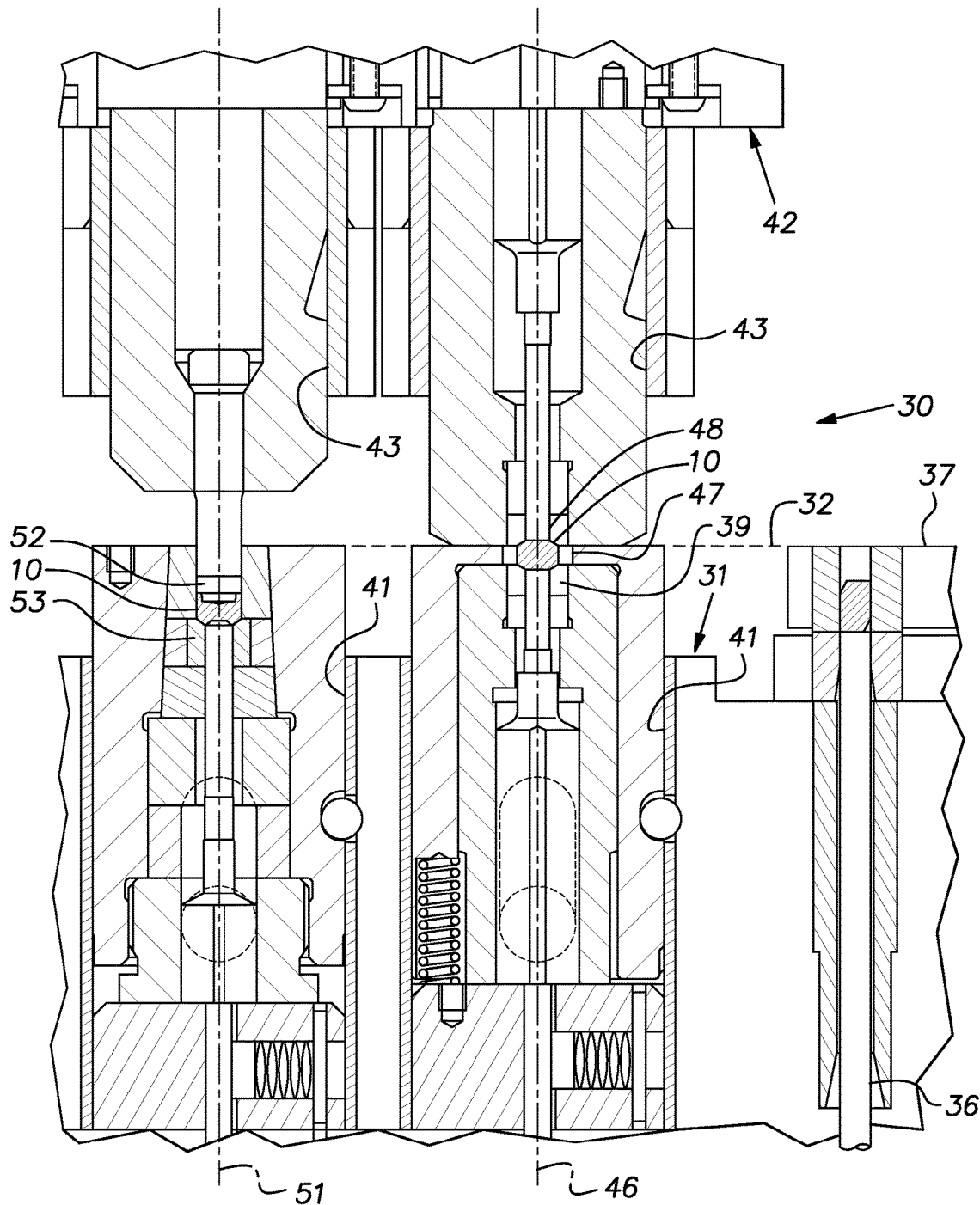
FIGS. 2A-2D diagrammatically show forming equipment and instrumentalities, including tooling, used to perform the steps shown in FIGS. 1A-1I.

While the disclosed solid head cartridge case is sometimes referred to as "rimless", it will be understood that this term applies to belted cases with their heads slightly larger than forward areas of their bodies. Despite the industry "rimless" terminology, the radially outer part of the cartridge case head at the back of the ejector groove can be considered a rim.

Referring to FIGS. 1A-1I, there is illustrated a preferred sequence of forming a finished cartridge case starting with solid wire stock in a progressive forming or forging machine. A blank 10, shown in FIG. 1A, is cut from coiled round wire stock with a shear operating synchronously with other operations of a forging machine described below in greater detail. A conventional transfer device, having an axial movement component, not shown, operates to shift a blank 10 from one station to the next, i.e. from right to left in FIGS. 1A-1I. At a first forming station (FIG. 1B), the blank 10, transferred from the cut-off station (FIG. 1A), is upset to square up its sheared end faces. At a second forming station (FIG. 1C), the blank 10 is formed with dimpled centers 11, 12 on its end faces to improve the forming concentricity in subsequent forming steps. In a third forming station (FIG. 1D), the blank 10 is triple extruded forming a cylindrical preform of a tubular wall 13 of a case cavity, an exterior surface of an eventual ejector groove 14 and a preform of a primer recess or pocket 16.

At a fourth station (FIG. 1E), the preform of the case cavity wall 13 is deep drawn to form another intermediate preform stage of this wall and a charge and bullet cavity 19. An initial form of a head 18 of the blank is shaped to preform the ejector groove 14 at a fifth station (FIG. 1F). The end of the case cavity wall 13 is cut to finish length at a sixth station (FIG. 1G). In a seventh station (FIG. 1H) the ejector groove 14 is finish formed. At an eighth station (FIG. 1I), the outside diameter of the cylindrical preform wall is forged into a slightly tapered shape to form the finished cavity wall 13. The center of a web 22, representing a forward part of the head 18 is pierced to form a flash hole 24 thus producing a finished cartridge case 25 with the remaining part of the web effectively closing the inner end of the cavity 19.

FIGS. 2A-2D schematically illustrate a multi-station forming machine 30 that includes tooling, i.e. dies, punches and other instrumentalities to perform the steps outlined above to manufacture finished cartridge cases 25 of the invention. The lower portion of these figures shows a die breast or bolster 31; a line at 32 designates a reference plane sometimes known as the face of dies (FOD) on the die breast.

Blanks 10 are carried by a transfer mechanism from right to left in FIGS. 2A-2D stopping at each station to be progressively formed. The transfer mechanism can be of a style like that shown in U.S. Pat. No. 5,713,237 that can axially withdraw and insert a blank from and into a die of a workstation. A blank 10 is cut from round wire stock 36, supplied from a coil, by a shear 37 and then transferred to a first station 46. The blanks produced at the cut off shear preferably have a length to diameter ratio of at least 1.16 and more preferably a ratio of more than 1.5 and most preferably more than 1.7. The illustrated forming machine 30 has eight forming stations in addition to the cutoff station. The cutoff and successive stations are equally spaced along a horizontal line. Each station on the die breast 31 has a receiving or die bore 41 for a die case and on a reciprocating ram or slide 42 there is a coaxial tool bore 43 for receiving a tool or punch case. The cartridge case 25 described and illustrated is a 9 mm case; while brass is ordinarily used for manufacturing cases, other materials such as steel or aluminum may be used to practice the invention. At the first station, indicated at its centerline by a numeral 46 (as in subsequent stations), a sliding die ring 47 radially constrains the mid-section of the blank 10. The ring 47 can slide axially relative to an associated die 39 so that it moves with the blank and does not significantly restrict the blank from being fully shaped in the corners of the die when upset by a punch 48. In this first forming station 46 the blank 10 takes the shape of a pill with a length to diameter ratio of about 0.6.

At a second workstation 51, the blank is formed with the dimpled centers 11 and 12 on its end faces by a punch 52 and die 53 to improve the tool and blank alignment in the next stations.

In a third station 55, the blank 10 is subjected to a triple extrusion where the preform of the wall 13 of the cartridge case cavity 19, the preform of the ejection groove 14, and the preform of the primer pocket 16 are formed by a die assembly 56 and a punch assembly 57. A reduced outside diameter of the preform of the head 18 is slightly smaller, e.g. about 0.35 mm smaller than the diameter of the eventual radial base of the ejector groove 14 (shown finished in FIGS. 1H and 1I).

Figure 2B:
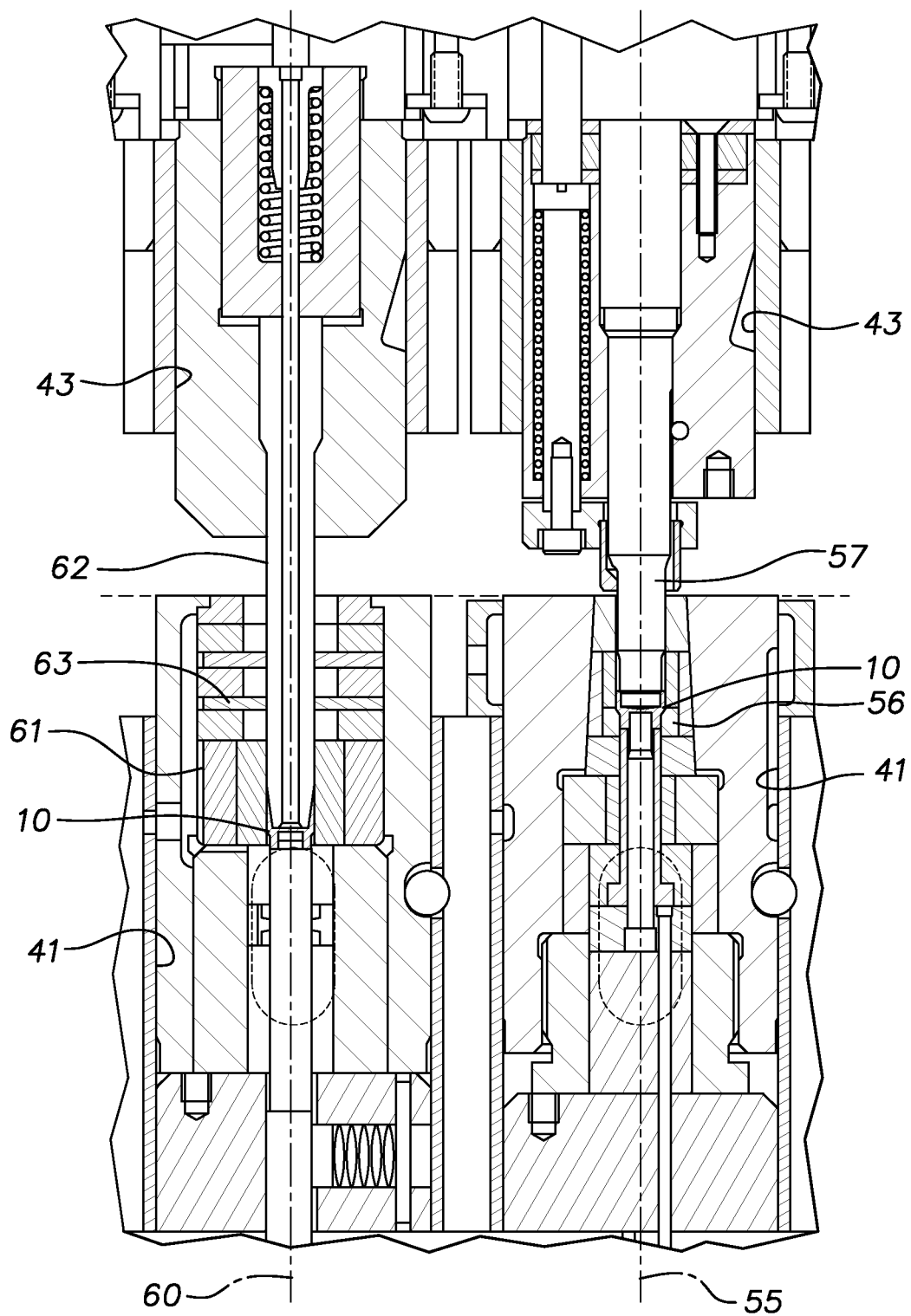

At a fourth station 60, to the left in FIG. 2B, the blank 10 is deeply drawn in a die assembly 61 over a punch 62 by progressively smaller wafers 63 to form the thin preform wall 13 of the case cavity 19. A free end of the drawn tube or wall 13 is normally characterized by an irregular edge.

Figure 2C:
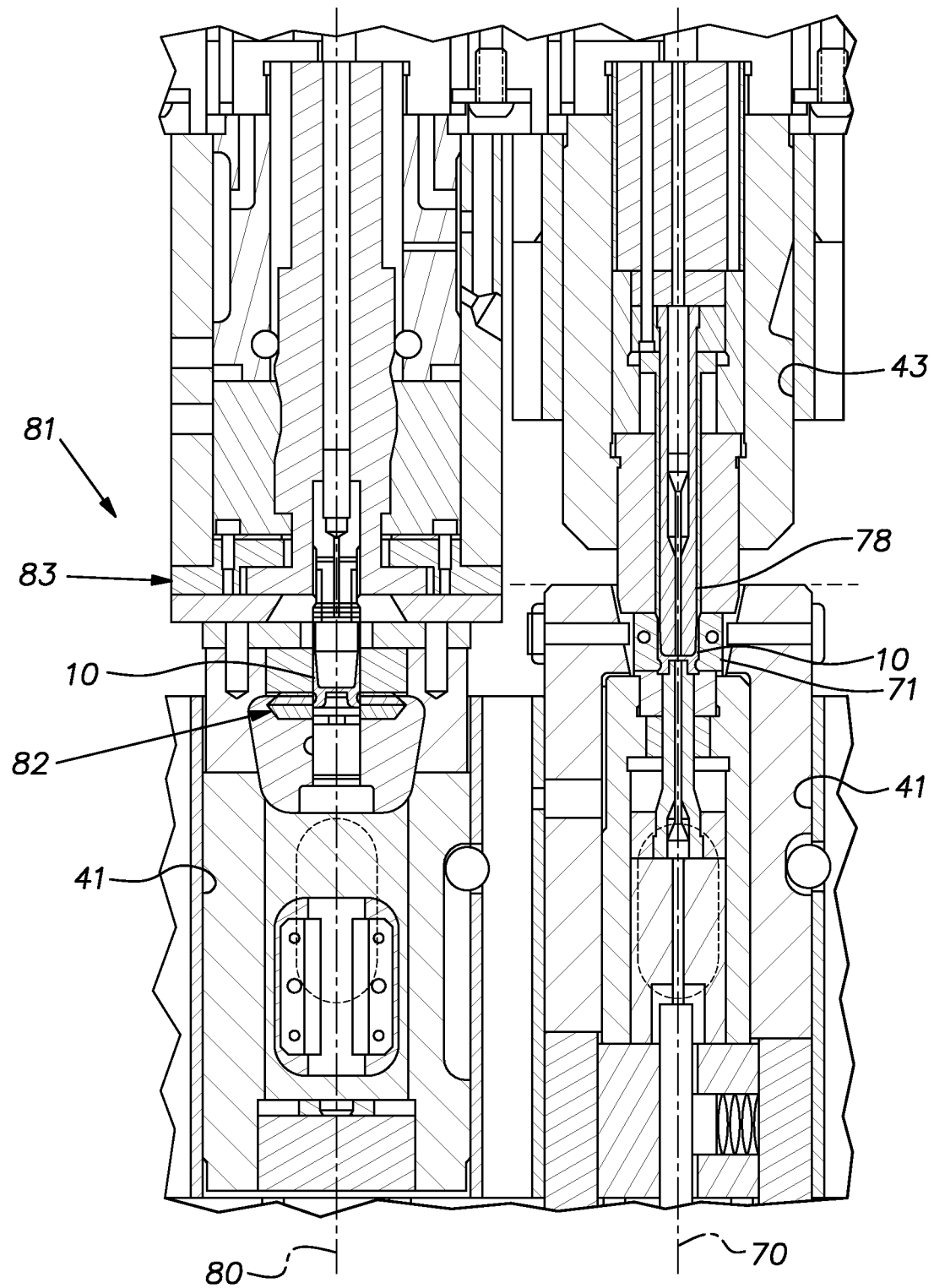
Figure 2D:
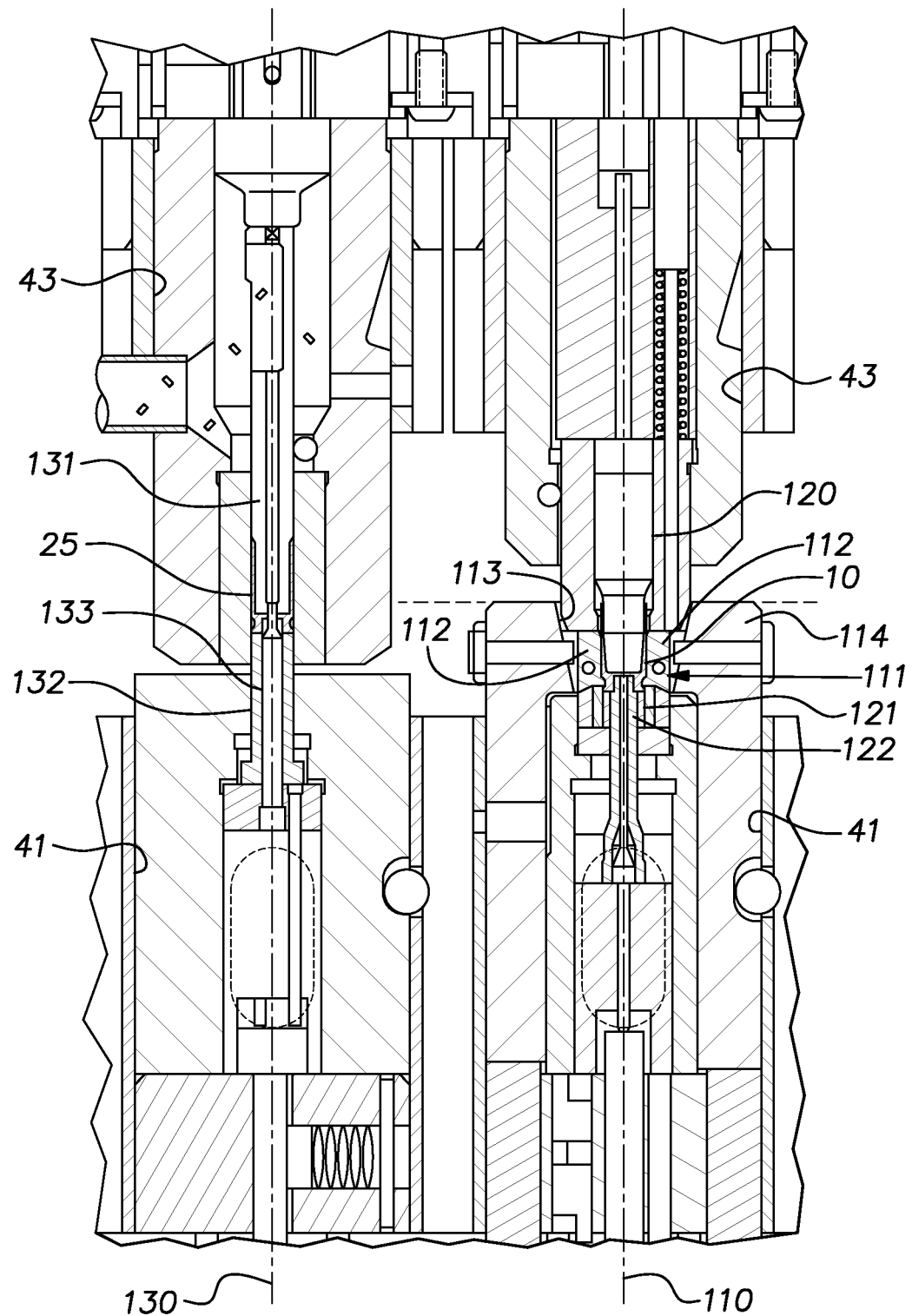

At a fifth station 70, to the right in FIG. 2C, a preform of the ejector groove 14 is formed on the head end of the blank 10. This is accomplished with a segmented die assembly 71 diagrammatically illustrated in FIGS. 3 and 3A. Four segments 72 (only two segments are seen in the cross-section of these FIGS.) are cammed radially inwardly around the blank as they are driven into a conical bore 75 of a die case 73. Upon further advance of the ram, the segments 72 are held closed by a high pressure lever 74 and gas spring 76 against forming pressures in the blank tending to open the segments 72. The lever 74 operates on the segmented die assembly through rods 77. As mentioned, the minor outside diameter of the preform of the case head 18 produced at the third station 55 (FIGS. 1D and 2B) is nominally the same, although preferably slightly smaller, than the diameter of the base or minimum diameter of the preform of the ejector groove 14 produced here. In this fifth station 70, the distal or outer end of the blank head is folded or upset radially outwardly to initially make a preform rear flange wall or rim for the ejector groove. In their closed positions, as seen in FIGS. 3 and 3A, the segments 72 collectively encircle an annular zone precisely complimentary to the rim and groove preforms so that the head area of the blank is fully constrained when a punch 78 reaches front dead center.

Figure 4:
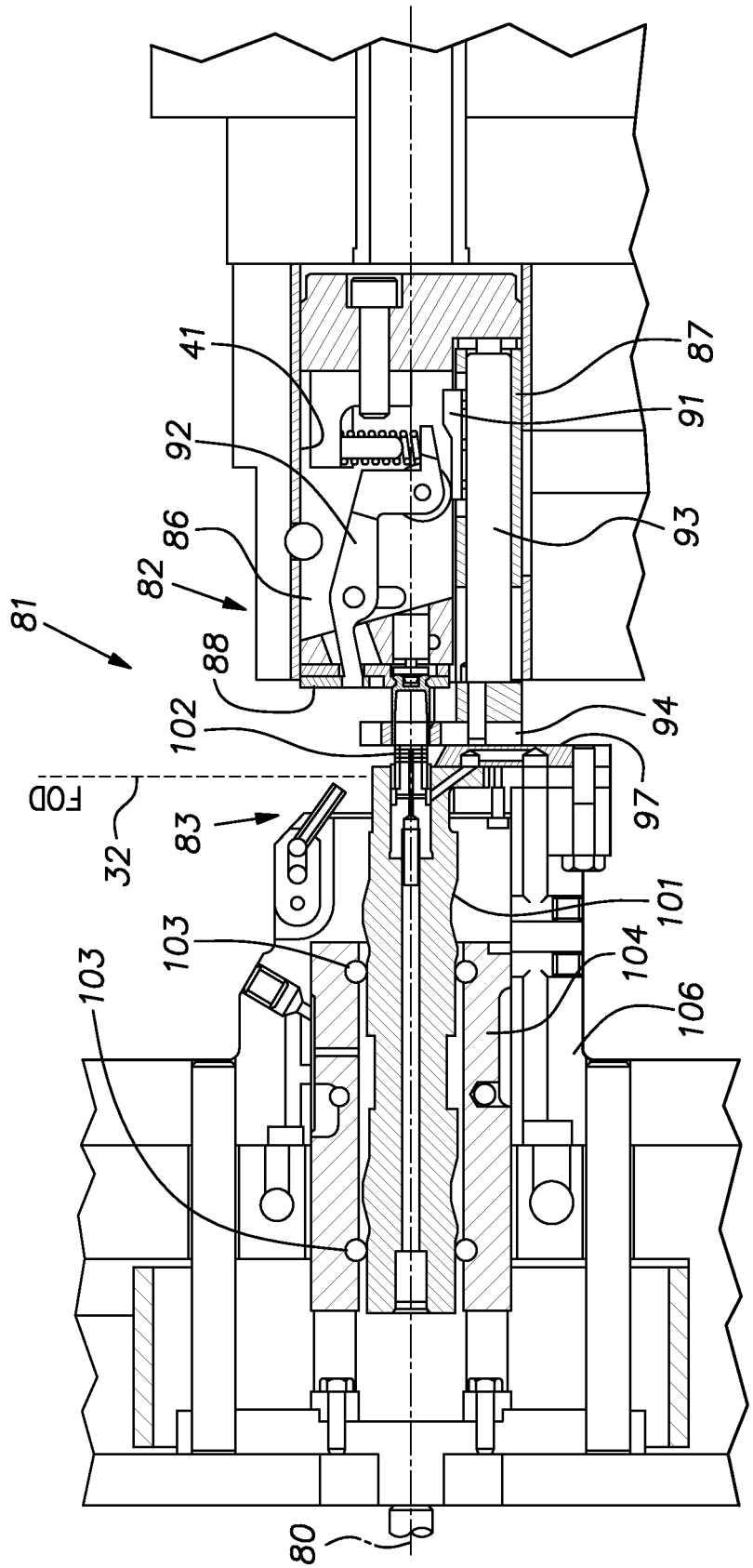
FIG. 4 is a cross-sectional view of a blank end trimming station.
Figure 4A:
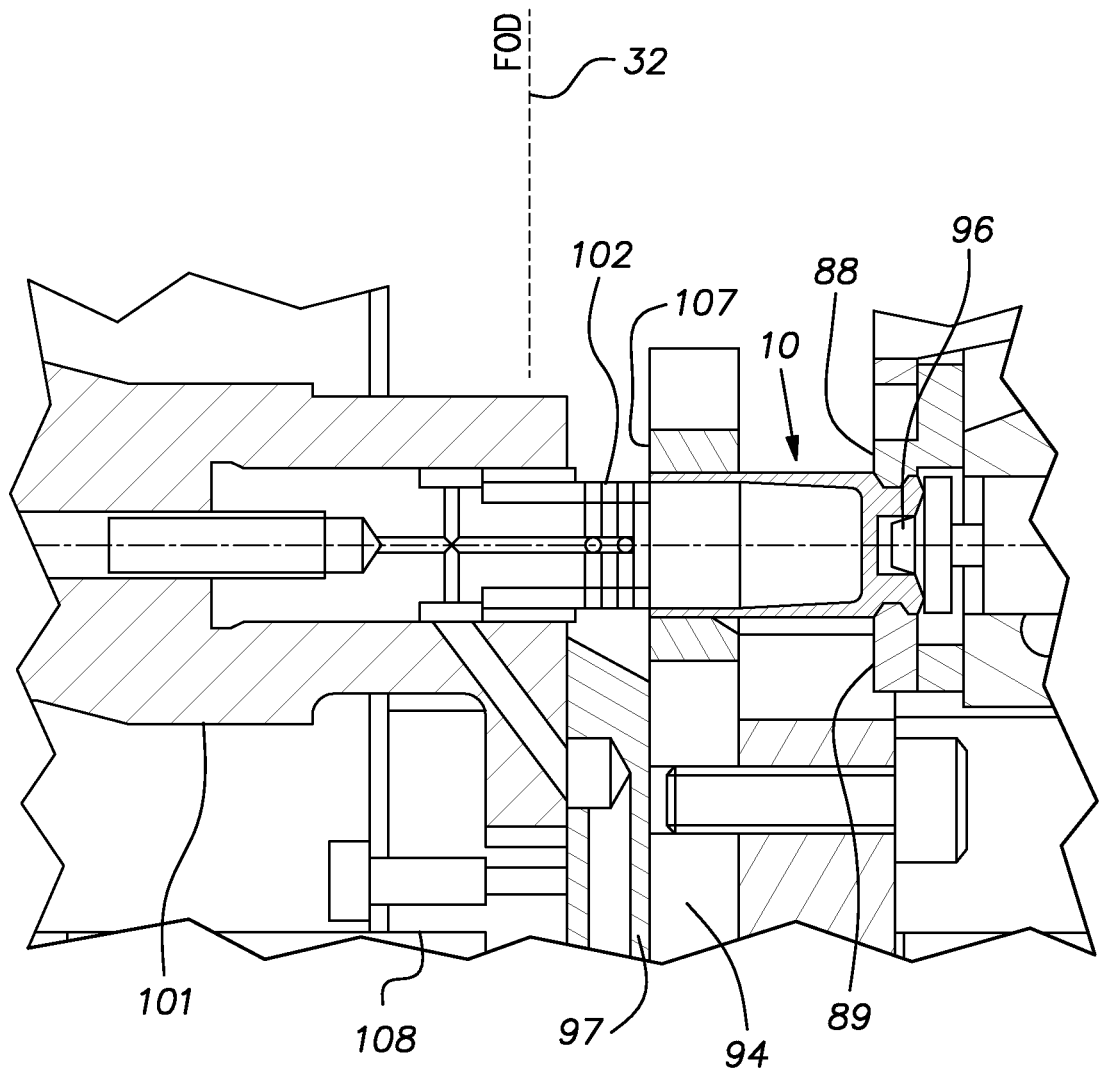
FIG. 4A is an enlarged view of the cutting area of the blank end trimming station.

At a sixth station 80, the blank 10 is trimmed to remove the irregular free edge at the mouth of the drawn case cavity wall and to determine the finished length of the cartridge case. The blank material is removed preferably in one piece as a short scrap ring. The removal is accomplished in a shearing process that advantageously avoids creation of significant dust, particles and/or chips of the blank stock. Referring to FIGS. 2C, 4 and 4A, the trimming apparatus, designated 81, comprises a blank gripping device 82 on the die breast 31 and a shear tool or punch device 83 on the ram 42. It will be seen that the gripping apparatus 82 is operated by motion of the ram 42. The blank gripping apparatus 82 is housed in upper and lower die case sections 86, 87. The upper die case section 87 supports a pair of opposed grippers 88, 89 at the face of die plane 32 when it is in a forward position in the die case bore 41. Relative motion between the lower and upper die case sections 86, 87 results in closing and opening of the opposed grippers 88, 89. This gripper motion is produced by cams (only one cam 91 is seen in the view of FIG. 4) on the lower die case section 86 that operate levers (only one lever 92 is seen in FIG. 4) on the upper die case section 87. The illustrated cam 91 and lever 92 operate the lower gripper 89 while the unseen cam and lever operate the upper gripper 88. The die case sections 86, 87 are biased toward the ram 42 by respective gas springs. A gas spring 93 biases the lower die case section 86 towards the ram; gas springs associated with the upper die case section 87 are not seen in the view of FIG. 4. A shear plate 94 on the lower die case section 86 is at a fixed axial distance in front of the section. The transfer delivers a blank 10 to this station 80 and sets its primer pocket preform on an alignment pin 96. Initial movement of the lower die case section 86 relative to the upper die case section 87 resulting from contact of a leading plate 97 on the trimming apparatus 81 with the shear plate 94, driven by advance of the ram 42 causes the grippers 88, 89 to engage and hold the blank 10 at opposite sides of the preform ejector groove. This gripping action is benefited by the wedging afforded by the tapered sides of the preform ejector groove.

Further advance of the ram 42 causes the lower case section 86 to drive the upper case section 87 against its spring bias. This displacement of the die case sections 86, 87, as will be explained, allows the blank 10 to be trimmed over a relatively long part of the ram retraction stroke.

The shearing device 83 mounted in the punch bore on the ram 42 at this sixth station 80 removes a short ring with the irregular edge formed at the free end or mouth of the cylindrical case body previously drawn at the fourth station 60. The apparatus 81 includes an elongated cam 101 extending along the axis of the station 80. At a distal end, the cam 101 holds a pin-like cylindrical cutting tool or shear 102 made of suitable hard tool steel sized to fit into the open end of the blank cavity 19. The cam 101 is supported on two sets of four rollers 103. One set of the rollers 103, seen in FIG.

4 are in horizontal planes with two above the cam 101 and two below the cam. The other set of rollers, not seen in FIG. 4, are in vertical planes with two on a side of the cam 101, below the plane of the drawing, and two on the other side of the cam, above the plane of the drawing. The rollers 103 are journalled in a sleeve 104. The sleeve 104 is adapted to slide axially in a tool holder 106 fixed on the ram 42. External contours of the cam 101 are made to drive the cam from a "home" position concentric with the axis of the station 80 first laterally or radially off center and then in a four lobed orbital path to effect full angular rotation about the station axis. The eccentric motion of the cam 101 is produced when the cam and sleeve 104 move axially relative to one another.

The shear tool 102, which has the shape of a plain cylinder and is initially centered on the station axis, enters the blank as the ram 42 approaches the die breast 31 and the grippers 88, 89 have locked in the ejector groove preform. The shear plate 94 carries an annular insert or collar 107 of suitably hard tool steel. The insert 107 has a central bore proportioned for a relatively tight slip fit over the thin wall case cavity. The various parts are dimensioned such that a cantilevered end of the tool 102, having a radial end face with a sharp peripheral edge is at a plane at which the case blank is to be trimmed. Similarly, the peripheral edge of the bore of the insert 107 is sharp and lies essentially at the plane where the blank is to be sheared. Axial clearance between the end face of the tool 102 and edge of the bore of the insert 107 is as small as practical. The blank 10 is trimmed at this station 80 to determine its final length.

As shown in FIGS. 4 and 4A, the tool 102 is supported axially and radially on the cam 101 solely from a side of the shear plane at the face of the insert or collar 107 remote from the collar. FIGS. 4 and 4A illustrate the position of the tool 102 and insert 107 when the ram is at front dead center, a condition where the ram 42 has no velocity. The die case sections 86, 87 are fully retracted into the associated die breast bore 41. As the ram 42 retracts, the die case sections 86, 87, and the insert 107 on the periphery of the blank, move in unison with the ram 42 and shear pin tool 102, being driven towards the ram by their gas springs. A timed knockout pin mechanism, known in the art, holds the sleeve 104 stationary while the cam 101 is caused to move with the ram 42. The leading plate 97 combined with retainer 108 positions the cam 101 allowing the cam to move laterally but not axially relative to the ram 42. The outer peripheral edge of the tool 102 and the inner peripheral edge of the insert 107 cooperate in the shearing action to cut a scrap ring off of the main body of the cartridge case blank 10.

The gas springs associated with the die casing sections 86, 87 cause the sections to move out of the die bore following the heading slide or ram 42 until the upper section 87 reaches the limit of its motion in the die block. As the ram 42 continues to retract, the transfer grips the blank and the grippers 88, 89 are opened as the lower die case section 86 continues to follow the ram under the force of its gas spring. Limited continued movement of the lower die case section 86 pushes the shear plate 94 off the blank 10 thereby allowing the transfer to grip and move the blank to the next station. The severed short scrap ring is driven off the shear pin 102 with an air blast. The sleeve 104 is eventually returned to its starting position by the timed knockout mechanism and the cam 101 and shear pin 102 are likewise returned to their starting position.

Figure 5:
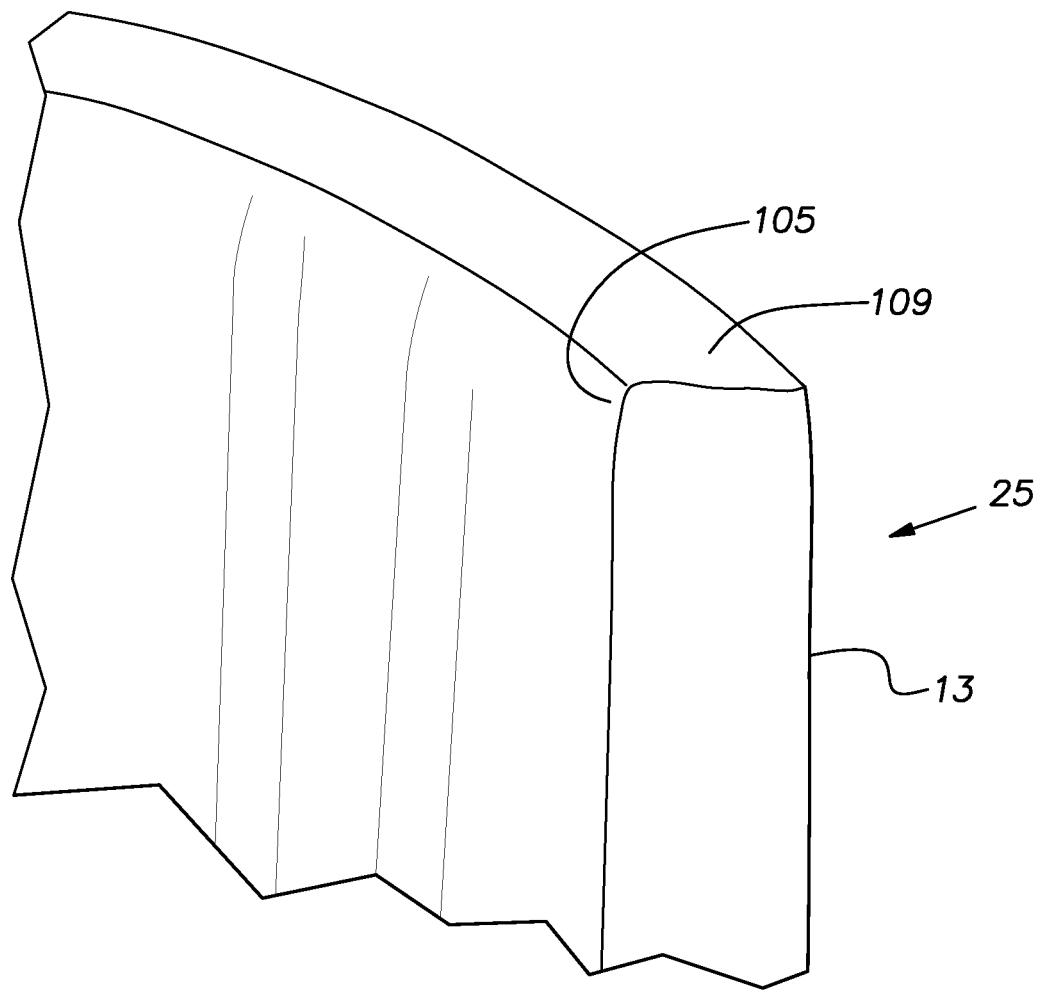
FIG. 5 is a fragmentary sectional view, on a greatly enlarged scale, of the mouth of the cartridge case of the invention.

FIG. 5 illustrates the unique shape of the cartridge case mouth produced by the disclosed trimming apparatus 81. An inner peripheral surface 105 at an edge 109 of the mouth of the finished case 25 is "rounded over" or bell mouthed by the internal cutting or shearing action of the shear pin tool 102. This outwardly flared mouth geometry can facilitate assembly of a projectile into the cavity formed by the case wall 13.

The blank 10 is transferred to the seventh station 110 where, like the fifth station 70, a segmented die assembly 111 is used. Conical segments 112 are assembled in a tapered bore 113 of a die case 114. The segments 112 are held closed against forming pressures by a large gas spring and lever like that shown in FIG. 3. At this station 110, the cartridge head including the ejector groove 14, is precision finish formed. The finished head 18 includes a full shoulder or "rim" with a forwardly facing radial side surface 116 constituting the rear boundary of the ejector groove 14. The ejector groove 14 is, additionally, defined by a cylindrical bottom 117 and a conical rearwardly facing side or surface 118. The segments 112, when closed, and die elements 121, 122 precisely define and tightly confine the head 18 including the peripheral boundary of the ejector groove 14 and primer pocket 116 when the ram 42 carrying a punch 114 reaches front dead center. Preferably, the segments of the sliding die assembly in both the fifth and seventh stations are four in number with the segments of the seventh station being displaced 45 degrees out of angular registration with the segments of the fifth station to reduce the possibility of flash on the blank which could occur between adjacent segments. Any head stamp to be applied to the cartridge case 10 is preferably done in the seventh station by the die elements 121, 122.

For purposes of this disclosure, the head of the cartridge case 10 is that part rearward of the front of the web 22. From the foregoing, it will be seen that in each forming blow of the head material, the tooling completely constrains this material at front dead center of the ram stroke.

The blank 10 is transferred to an eighth station 130 where the tubular thin cylindrical wall of the charge and bullet cavity 19 is forged into a slight taper in a punch assembly 131 and die assembly 132. Additionally, the web 22 between the primer pocket 16 and the charge and bullet cavity 19 is pierced by a die pin 133 at the axis of the station 130 to create the primer flash hole 24. The blank 10 is thus finished at this station 130 and is ejected as a finished part.

The disclosed process of cold forming the material of the blank head 18 in the various forming steps creates a superior grain structure at the ejector groove 14 so that a harder, stronger and precision formed cartridge case head is produced which is less prone to jam or otherwise fail during ejection.

The finished cartridge case wall 13 has exhibited a reduced tendency to crack, even though it is not annealed, when compared to conventionally cupped, drawn, annealed and machined cases. While the reasons for this improved performance are not fully understood, it is presently believed to be at least partially the result of extreme cold working of the blank and disruption of its grain structure when it is converted from a wire derived blank with a relatively high ratio of length to diameter of, for example, about 1.8 to a relatively flat pill-shaped blank with a relatively low length to diameter ratio of, for example, about 0.6. The relatively high length to diameter ratio is also beneficial in eliminating the effects of cut-off distortion in the end faces of the original form of the blank.

Another factor in the crack resistance of the inventive case may be the avoidance of grain patterns aligned with the tubular wall. Apparently, the crack resistance of the inventive case is the reason it can be reloaded more times than conventionally made cases.

The inventive cartridge case, being made on a single machine, is more readily held to precise dimensional standards. The disclosed process for making the cartridge case has the potential to greatly increase the production capacity of a facility of a given size over traditional methods while using less labor, floor space, energy and material.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A trimming apparatus for producing a uniform sheared edge on a tubular work piece having an axis in a multistation cold forming machine comprising a collar with a circular bore defining an axis and adapted to slip over the work piece, the circular bore having a sharp peripheral edge lying in a plane, a tool with an end sized to fit in the work piece, the tool end having a sharp edge, and a mechanism having relatively movable elements that produce radial motion of the tool relative to the axis of the circular bore and orbital motion of the tool about the axis of the circular bore, the mechanism being adapted to provide sole axial support of the tool from only a side of the plane of the sharp peripheral edge remote from the collar, the tool and collar edges during such radial motion and orbital motion being arranged to shear the tubular work piece to sever a ring therefrom and produce said uniform edge.

* * * * *